J. POWERS.
WHEEL CHAIN FOR VEHICLES.
APPLICATION FILED SEPT. 5, 1919.
1,391,402.
Patented Sept. 20, 1921.
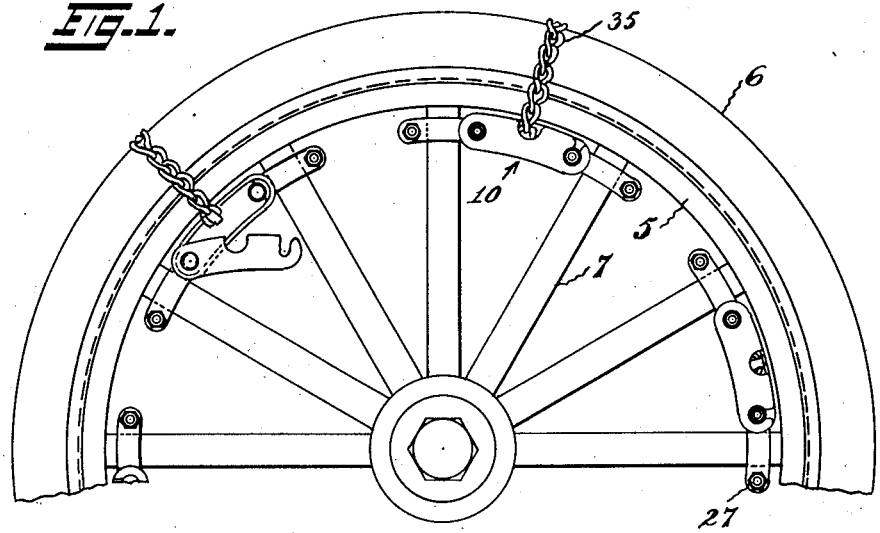
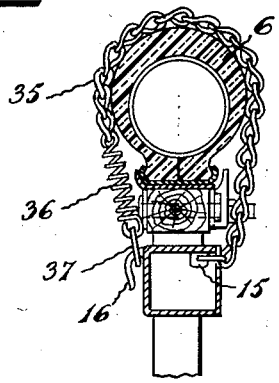
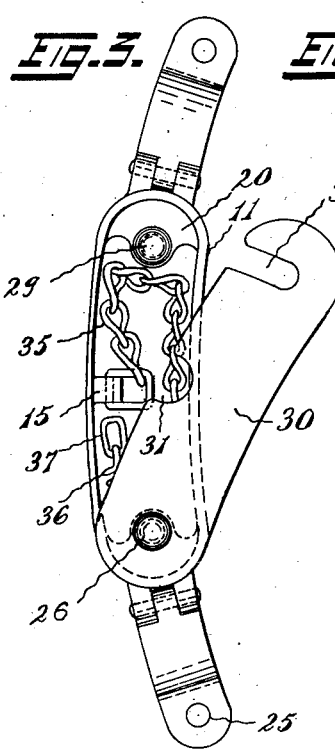
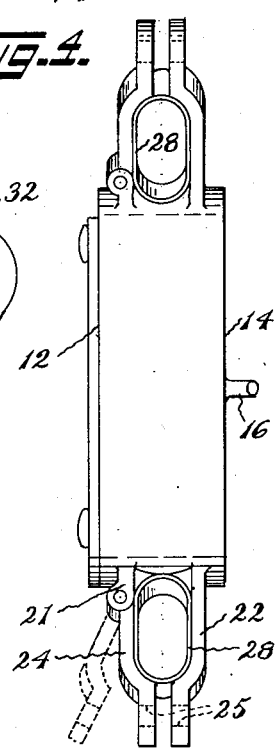
Witnesses;
Chas. G. Whiteman
H. D. Penney
Inventor:
James Powers,
By his Att'y, F. H. Richards

UNITED STATES PATENT OFFICE.

JAMES POWERS, OF NEW YORK, N. Y.

WHEEL-CHAIN FOR VEHICLES.

1,391,402. Specification of Letters Patent. Patented Sept. 20, 1921.

Application filed September 5, 1919. Serial No. 321,912.

*To all whom it may concern:*

Be it known that I, JAMES POWERS, a citizen of the United States, residing in New York city, in the county of New York and State of New York, have invented certain new and useful Improvements in Wheel-Chains for Vehicles, of which the following is a specification.

This invention relates to means for storing tire-chains for automobile wheels, when the chains are not in use; and has for its object to provide convenient means or pockets mounted on the wheel itself for storing the chains when not in use.

Other objects of the invention will appear as the description proceeds; and while herein minute details of the invention are described, the invention is not limited to these, since many and various changes may be made without departing from the scope of the invention as claimed.

In the accompanying drawings, showing by way of example one of many possible embodiments of the invention,—

Figure 1 is a side elevation of a portion of a wheel showing my device applied thereto;

Fig. 2 is a sectional view taken transversely through the tire, the felly and the chain-storing means;

Fig. 3 is a side elevation of the storing means showing it open; and

Fig. 4 is an elevation taken at right angles to that of Fig. 3, and showing the storing means closed.

My new device is illustrated in combination with a wheel having a felly 5, a tire 6 thereon, and spokes 7, and comprises a plurality of chain pockets 10 disposed between adjacent spokes 6. Each pocket 10 comprises a one-piece arcuate housing 11, open at one side 12 and provided on the inner face of its outer wall 14 with a perforated lug 15 and exteriorly on the outer edge of the wall 14 with an inwardly pointed chain hook 16. At each end, the housing is provided with a thickened end wall 20 and a projecting hinge lug 21 and a fixed spoke-clamping member 22 engaging one side of a spoke 6. A hinged spoke-clamping member 24 is hinged to said hinge lug 21 and engages the other side of the spoke. The free ends of said clamping members 22 and 24 are provided with bolt-holes 25 through which pass clamping bolts 27 for clamping the pockets to the spokes. Layers of felt 26 disposed around the spokes between the spokes and the clamping members 22 and 24 prevent the defacing of the spokes by the clamping members.

Headed pins 28 and 29 are inserted in said thickened walls 20 at said open side; and on one of said pins 28 is pivoted a closure plate 30 for said open side. Said plate 30 is provided with a cut-away portion 31 at its outer edge, and with a securing slot 32 at its free end for embracing and frictionally engaging the other pin 29.

A chain 35 is secured to said perforated lug 15, and a helical spring 36 secured to the outer end of the chain. A ring 37 secured on the outer end of the spring is adapted to be hooked on said chain hook 16 when the chain is disposed around the tire, as shown in Fig. 2.

When the device is not in use the chain and helical spring are retained in the housing 11; but as soon as the chain is needed, the closure plate 30 is opened as shown in Fig. 3, and the chain passed around the tire, and the ring 37 hooked upon the chain hook 16, as shown in Fig. 2, thus putting the spring under tension whereby to hold the chain snugly on the tire. The closure plate 30 is then closed leaving the chain passing out at the cut-away portion 31. When the chain is no longer needed it is restored to the pocket and the closure plate closed.

While herein I have described the pockets as being detachable and forming no part of the permanent structure of any part of the wheel, felly or rim, it is particularly stressed that the invention as claimed is not so limited.

I claim:

1. In combination, a wheel having a pocket thereon; and a chain secured to said wheel and adapted to be passed around the wheel tire or stored in said pocket, one end of said chain being anchored against circumferential displacement relative to the wheel.

2. In combination, a wheel having a tire thereon; a plurality of chain pockets secured on the wheel and open at one side; a closure for said open side provided with a cut-away portion; and chains each having one end secured to the interior part of a housing and adapted to be disposed around the tire and hooked on to the exterior of the housing.

3. In combination, a wheel comprising a tire and spokes; a plurality of chain pockets secured between adjacent spokes and each comprising a housing open at one side; a pivoted closure plate for said open side provided with a cut-away portion at its edge; and chains each having one end secured to the interior part of a housing and adapted to be disposed around the tire and hooked on to the exterior of the housing.

4. In combination, a wheel comprising a felly, a tire thereon, and spokes; a plurality of chain pockets disposed between and secured to adjacent spokes and each comprising a housing open at one side and provided interiorly in its outer wall with a perforated lug and exteriorly on the outer edge of the wall opposite the open side with a chain hook and at each end with a thickened end wall; headed pins inserted in said thickened walls at said open side; a closure plate for said open side and pivoted on one of said pins and provided with a cut-away portion at its outer edge, and with a securing slot at its free end for embracing the other of said pins; a chain secured to said perforated lug and adapted to be disposed in said housing; and a ring secured on the outer end of the chain and adapted to be hooked on said chain hook when the chain is passed through said cut-away portion and disposed around the tire.

5. In combination, a wheel comprising a felly, a tire thereon, and spokes; a plurality of chain pockets disposed between adjacent spokes and each comprising a one-piece arcuate housing open at one side and provided interiorly on its outer wall with a perforated lug and exteriorly on the outer edge of the wall opposite the open side with an inwardly pointed chain hook, and at each end with a thickened end wall and a projecting hinge lug and a fixed spoke-clamping member engaging one side of a spoke; a hinged spoke clamping member hinged to said hinge lug and engaging the other side of the spoke, the free ends of said clamping members being provided with bolt-holes; clamping bolts passing through said holes; headed pins inserted in said thickened walls at said open side; a closure plate for said open side and pivoted on one of said pins and provided with a cut-away portion at its outer edge, and with a securing slot at its free end for embracing the other of said pins; a chain secured to said perforated lug; and a ring secured on the outer end of the chain and adapted to be hooked on said chain hook when the chain is disposed around the tire.

6. In combination, a wheel having a tire and spokes; a non-skid means additional to and attached to said wheel and adapted at times to be passed around the wheel tire and at times to be stored on said wheel out of contact with the spokes of the wheel; and means additional to the wheel for holding said non-skid means out of contact with the spokes of the wheel when thus stored, one end of said non-skid means being anchored against circumferential displacement relative to the wheel.

7. In combination, a wheel; an anti-skid means attached to said wheel and adapted at times to be stored on said wheel; and means for holding said anti-skid means out of contact with the wheel when thus stored, one end of said non-skid means being anchored against circumferential displacement relative to the wheel.

JAMES POWERS.

Witnesses:
H. M. KILPATRICK,
H. D. PENNEY.